United States Patent [19]

Blume

[11] Patent Number: 5,249,600
[45] Date of Patent: Oct. 5, 1993

[54] VALVE SEAT FOR USE WITH PUMPS FOR HANDLING ABRASIVE FLUIDS

[76] Inventor: George H. Blume, 107 Morning Cloud Cove, Austin, Tex. 78734

[21] Appl. No.: 815,176

[22] Filed: Dec. 31, 1991

[51] Int. Cl.$^5$ .............................................. F16K 15/06
[52] U.S. Cl. ................................ 137/516.29; 137/902; 251/334; 251/359
[58] Field of Search .......................... 137/516.29, 902; 251/359, 334

[56] References Cited

U.S. PATENT DOCUMENTS

| | | |
|---|---|---|
| 2,103,503 | 12/1937 | White .......................... 137/516.29 X |
| 2,163,472 | 6/1939 | Shimer . |
| 2,665,675 | 1/1954 | Sheppard ........................ 251/359 X |
| 2,726,843 | 12/1955 | Evans et al. . |
| 2,904,065 | 9/1959 | Butlin . |
| 2,949,127 | 8/1960 | Malina ........................ 137/516.29 X |
| 3,054,422 | 9/1962 | Napolitano . |
| 3,107,895 | 10/1963 | Vogeli . |
| 3,127,905 | 4/1964 | Vogeli . |
| 3,164,364 | 1/1965 | McColl . |
| 3,174,718 | 3/1965 | Bowen et al. . |
| 3,202,178 | 8/1965 | Wolfe .............................. 137/516.29 |
| 3,426,741 | 2/1969 | Haagen . |
| 3,433,250 | 3/1969 | Hagihara . |
| 3,450,385 | 6/1969 | Paptzun . |
| 3,483,885 | 12/1969 | Leathers ..................... 137/516.29 X |
| 3,742,976 | 7/1973 | Bailey . |
| 4,822,000 | 4/1989 | Bramblet . |
| 4,860,995 | 8/1989 | Rogers . |

*Primary Examiner*—Robert G. Nilson
*Attorney, Agent, or Firm*—Gambrell, Wilson & Hamilton

[57] ABSTRACT

An improved valve seat which significantly decreases the impact stress caused by the impact of a mud pump valve body against the valve seat. The valve seat comprises a generally cylindrical body portion with a sealing surface which is sloped from the outer surface of the cylindrical body portion toward an interior throat of said cylindrical body portion. The valve body comprises a generally disc-shaped portion and a truncated conical portion. An elastomer insert is received in a groove in the valve body. The conical portion of the valve comprises a sloped face, including a metal portion and an elastomeric portion formed by the elastomeric insert. In the valve seat of the present invention, an annular pressure relief groove in the cylindrical body portion of the valve seat allows the sloped face of the valve seat to flex thereby relieving a significant amount of the impact load between the opposing face of the valve assembly.

6 Claims, 4 Drawing Sheets

VALVE SEAT FOR USE WITH PUMPS FOR HANDLING ABRASIVE FLUIDS

FIELD OF INVENTION

The present invention relates generally to valves used in pumps handling abrasive fluids. More specifically, the present invention provides an improved valve seat which significantly reduces the impact stress on valves and seat assemblies during the pumping operation, resulting in reduced wear on the valve assembly and improved reliability for the pumping system.

BACKGROUND

Pumping systems which are used to pump drilling mud and other abrasive fluids generally incorporate positive displacement pistons or plungers which operate in a reciprocating manner in individual cylinders. Each piston or plunger cylinder has a suction and discharge valve and valve seat operating alternatingly and independently to control flow into and out of each cylinder. The valve typically comprises a disc-shaped body portion which includes an elastomeric valve insert which serves to seal the valve when in the closed position and also serves to cushion the impact of the valve body in the valve seat. A lower conical seating surface of the valve body also makes contact with the valve seat when the valve is in the closed position.

Because of high pump pressures (between 2000 and 5000 psi) and the abrasive solid particles suspended in the drilling mud, valves and valve seats wear at a rapid rate and must be replaced frequently. One of the most significant points of impact stress in the valve assembly is the point of contact of the lower conical portion of the valve body and the valve seat when the valve is in the closed position. The extremely high differential pressures in the valve cause the conical portion of the valve body to engage the valve seat with a very high impact. The repetitive impact eventually causes the faces of the valve body and the valve seat to become worn and pitted. There is a need for an improved valve seat which reduces the impact stress related to the impact of the valve body with the valve seat.

The apparatus of the present invention overcomes the difficulties of the prior art by providing an improved valve seat which significantly decreases the impact stress caused by the impact of a mud pump valve body against the valve seat. The valve seat comprises a generally cylindrical body portion with a sealing surface which is sloped from the outer surface of the cylindrical body portion toward an interior throat of said cylindrical body portion. The valve body comprises a generally disc-shaped portion and a truncated contical portion. An elastomer insert is received in a groove in the valve body. The conical portion of the valve comprises a sloped face, including a metal portion and an elastomeric portion formed by the elastomeric insert. In the valve seat of the present invention, an annular pressure relief groove in the cylindrical body portion of the valve seat allows the sloped face of the valve seat to flex thereby relieving a significant amount of the impact load between the opposing faces of the valve assembly.

DETAILED DESCRIPTION OF THE PREFERRED EMBODIMENT

Figure 1:
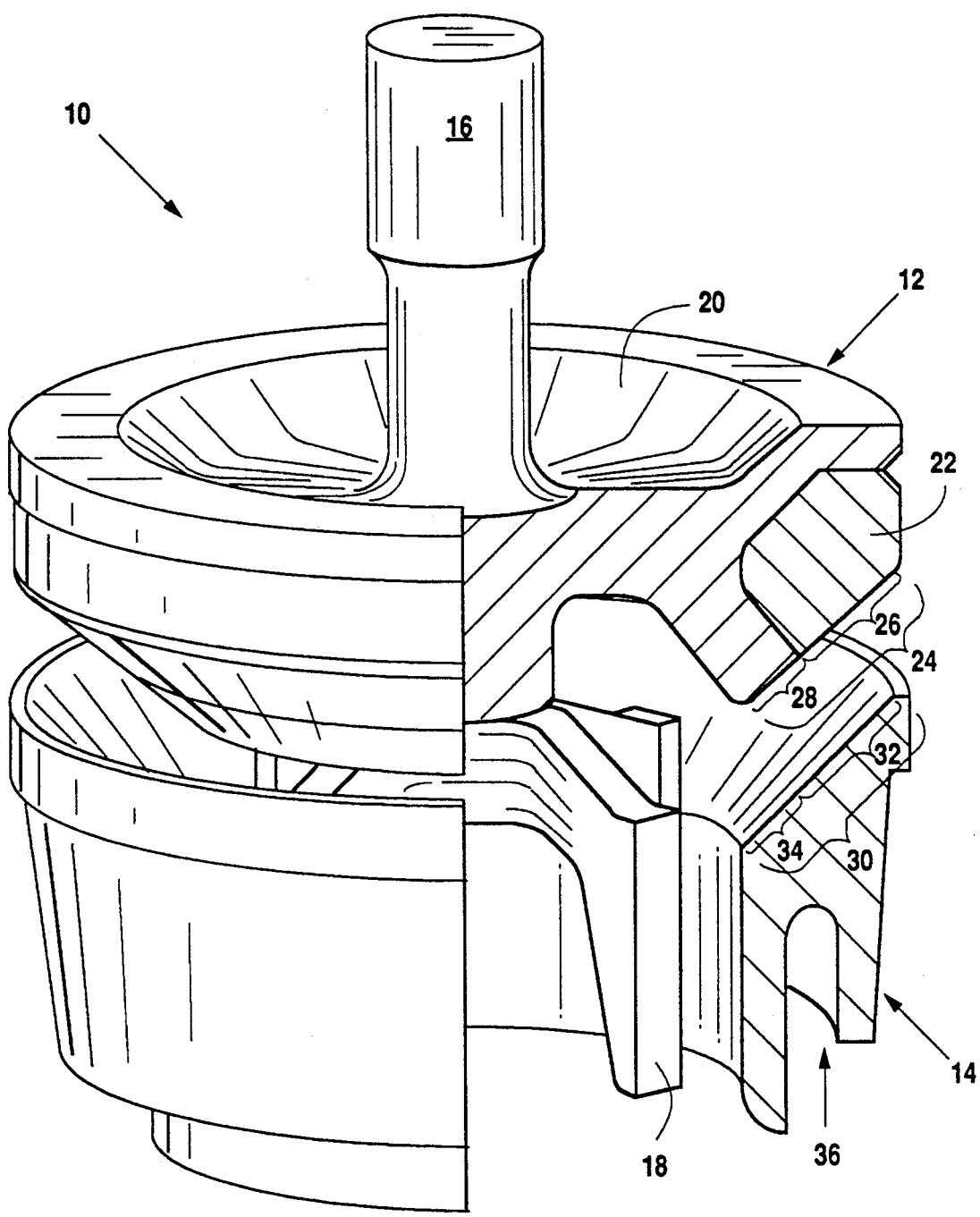
FIG. 1 is a perspective view of mud pump valve assembly utilizing the improved valve seat of the present invention.

FIG. 1 is a perspective view of a mud pump valve assembly 10 comprising the improved valve seat of the present invention. The valve assembly shown in FIG. 1 is in the full open position. The valve assembly 10 is broadly comprised of a valve body 12 and a valve seat 14. The valve body comprises an upper valve guide 16 which maintains proper registration of the valve body within the pump housing. A plurality of valve guide feet 18 serve to maintain proper alignment of the valve with respect to the valve seat 14. The valve body comprises a generally disc-shaped portion 20 which is formed of metal, such as steel which has been heat treated by a carburizing process. The outer portion of the disc-shaped body has a generally C-shaped cross-section with an annular groove being defined by the interior of the C-shaped portion. A polyurethane or rubber insert is received in this groove. The insert serves to provide a partial damping of the impact of the valve body against the valve seat. However, this impact in most prior art systems is still high enough to cause significant wear on the operating faces of the valve body and the valve seat.

Figure 2A:
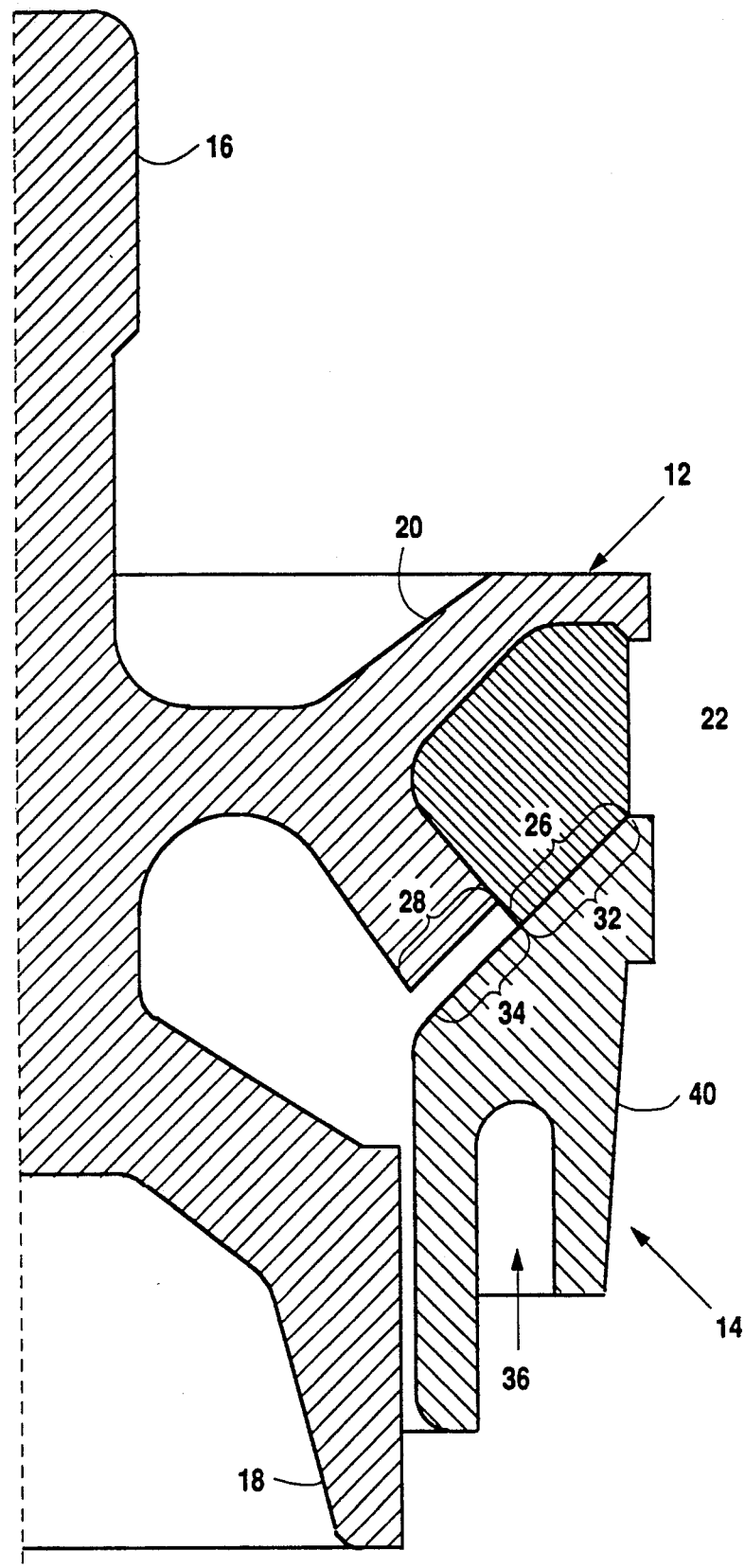
FIG. 2a is a cross-sectional view of the valve assembly of FIG. 1, showing the valve received in the valve seat with the valve in the closed position, just prior to maximum impact of the valve body against the valve seat.
Figure 2B:
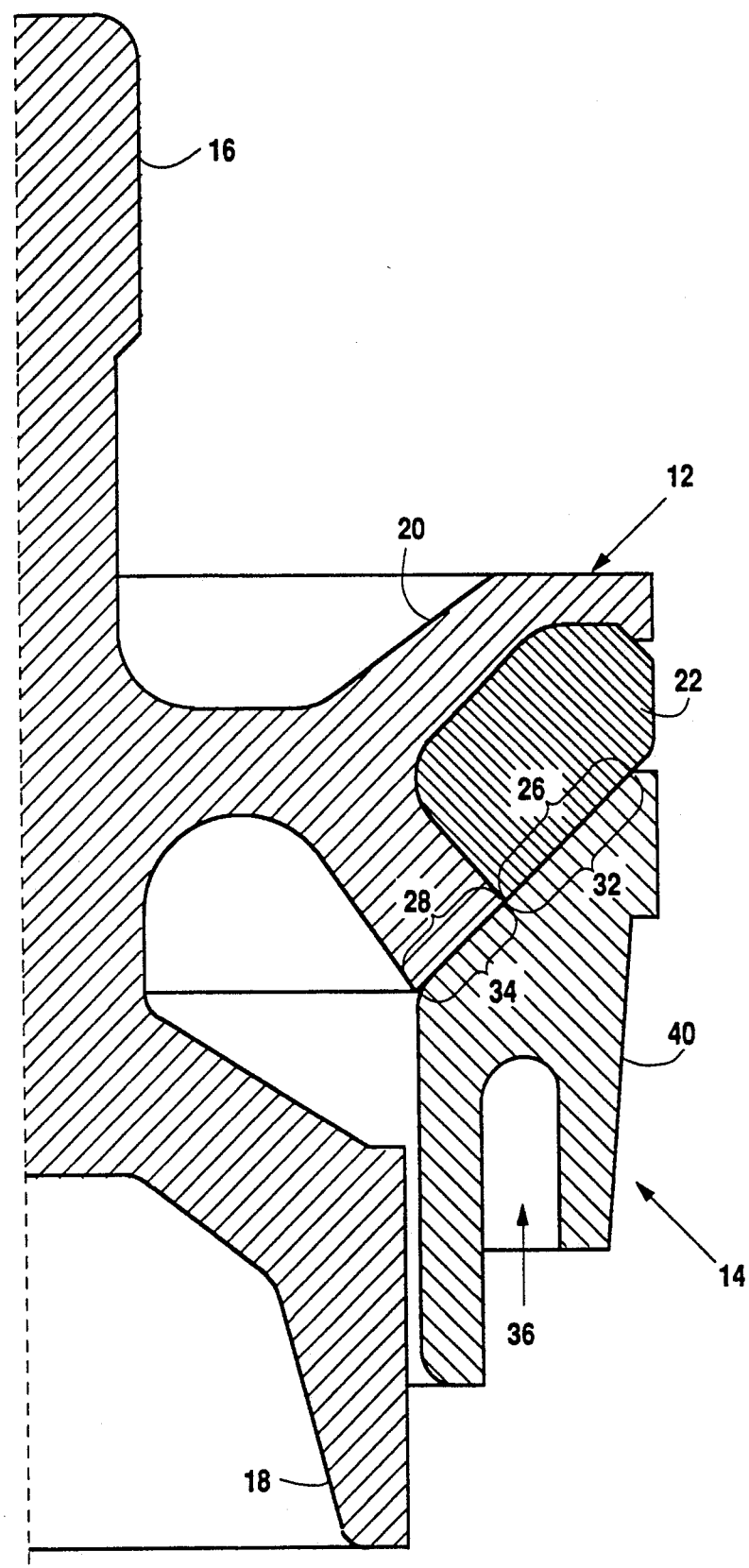
FIG. 2b is cross-sectional view of the valve assembly of FIG. 1, showing the valve received in the valve seat with the valve in the closed position just after maximum impact of the valve body against the valve seat.

The lower portion of the valve body has a somewhat conical cross-section with a sloped surface illustrated by reference numeral 24. The sloped surface 24 comprises a rubber portion illustrated by reference numeral 26 and a metal portion illustrated by reference numeral 28. The valve seat 14 comprises a seating surface 30 with a portion 32 which engages the rubber portion 26 of the valve body surface and a portion 34 which engages the metal portion 28 of the valve body surface. FIG. 2a is a cross-sectional view of the valve assembly of FIG. 1, showing the valve received in the valve seat with the valve in the closed position, just prior to maximum impact of the valve body against the valve seat. FIG. 2b shows the valve received in the valve seat with the valve in the full closed position, with maximum impact of the valve body against the valve seat. Typically, the elastomer portion of the valve seating surface will make initial contact with the seating face of the valve seat. This is illustrated in FIG. 2a by the contact of the sloped face 26 of the elastomer insert 22 against the portion 32 of the sloped metal face of the valve seat. Note that the metal portion 28 of the sloped face of the valve body is not yet in contact with the portion 34 of the sloped face of the valve seat. The extremely high differential pressure on opposite sides of the valve, however, causes the elastomer insert 22 to compress rapidly to the position illustrated by the compressed elastomer insert 22 shown in FIG. 2b. The rapid compression of the elastomer insert results in an extremely high impact of the metal portion 28 of the valve face with the portion 34 of the valve seat face. In prior art valve seats this results in rapid wear of the metal portion 28 of the valve body and the portion 34 of the valve seat face. In the valve seat of the present invention, however, an annular pressure relief groove 36 allows the sloped face of the valve seat to flex thereby relieving a significant amount of the impact load between the opposing faces of the valve assembly.

Figure 3:
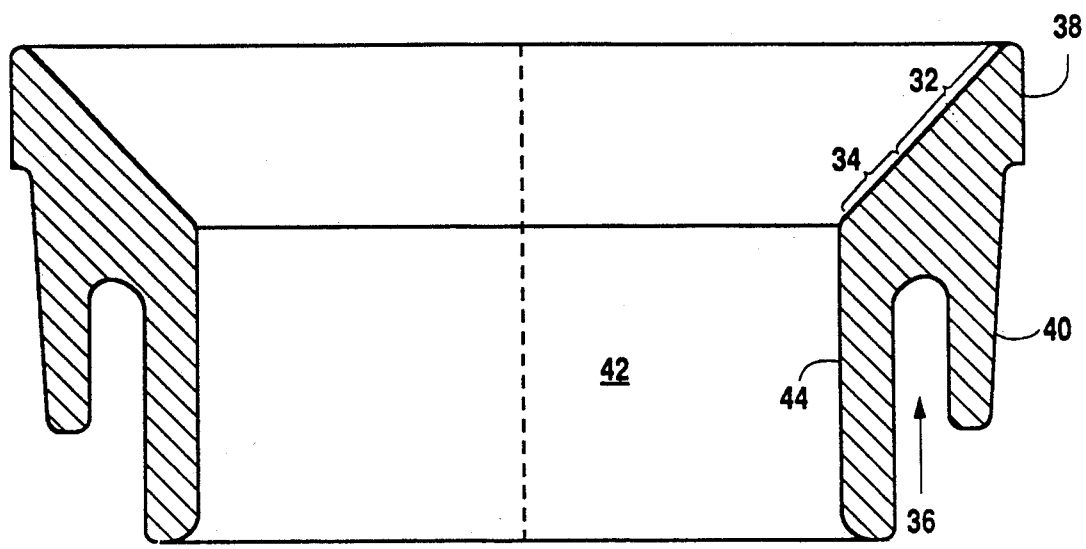
FIG. 3 is a cross-sectional view of the valve seat assembly of the present invention.

Details relating to the valve seat 14 can be seen by referring to the cross-sectional illustration of FIG. 3. The outer surface of the valve seat comprises a valve seat shoulder 38 and a sidewall 40 having a conical taper. The slope of the sidewall 40 allows the valve seat to be received in a standard pump deck portion of a valve pot. The valve seat throat 42, defined by the internal cylindrical sidewall 44, transports the fluid passed through the valve assembly.

Figure 4:
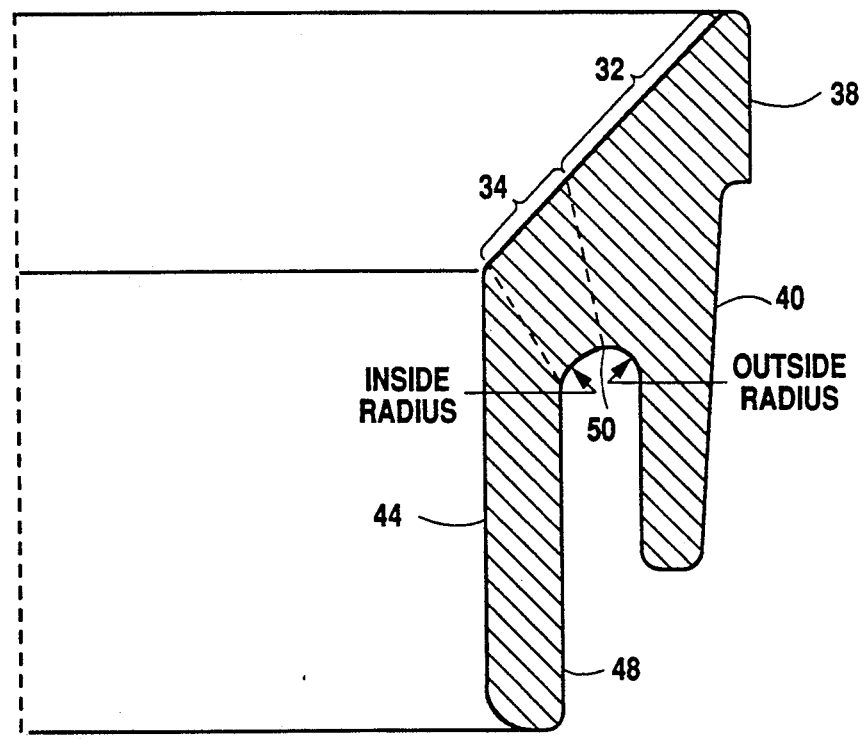
FIG. 4 is an enlarged view of a portion of the valve seat showing details relating to the geometry of the annular groove for reducing impact stress.

FIG. 4 is an enlarged view of a portion of the valve seat of the present invention showing details relating to the annular pressure relief groove 36. The relief groove is defined by vertical sidewalls 46 and 48 and an arch connecting the upper portions of the sidewalls 46 and 48. The arch is defined by two 90 degree segments with the inside segment having a radius which is two times as large as the radius of the outside 90 degree segment. The tangent point, illustrated by the reference numeral 50 is a point of smooth transition between the radii of the inside and the outside radii of the arch. The inside portion of the arch having the increased radius corresponds to the portion of the valve seat face which bears the impact of the metal portion of the valve body. Thus the impact load transmitted from the seating surface is dispersed over the larger radius inside the relief groove. This configuration maximizes flexure of the seating surface while preventing a stress concentration that would result in catastrophic shear failure of the seat.

Wear in the seating surface is directly proportional to the impact stress on the seating surface area of the valve seat. Impact stress "$\sigma$," which is reduced by the increased flexibility of the design of the present invention, is calculated using the following formula:

$$\sigma = \sigma_s(1 + [1 + (2h/y)]^{\frac{1}{2}})$$

where $\sigma_s$ = stress resulting when the valve load is applied statically;

h = distance the valve, under load, travels before impact; and y = deflection resulting from the static valve load against the seat.

Utilizing finite element stress analysis, the calculated values for $\sigma_s$ are approximately equal for the seating surface of a seat designed by the prior art and for the seating surface of the present invention. For both designs, the value of "h" is fixed and equal, being determined by the valve body and insert design. Again by finite element calculations, "y," deflection, is increased by a factor of 2 for the present invention. Using these values, the above equation yields values for impact stress, "$\sigma$," that are reduced by approximately 30% by the present invention.

The elastomeric insert is also positively affected by the present invention. The elastomeric seal, which is usually made of rubber or polyurethane material does not wear in the manner that the metal valve body and valve seat wear, i.e., through material loss. Material loss of the elastomeric seal is small during normal pump operation. Instead, the constant cyclical compression of the seal results in hysterisis in the seal that results in internal heat buildup and the eventual degradation of material strength to the point that the seal fails. As the metal valve and seat wear in the form of material loss from the impact stress, the amount of compression increases, hysterisis also increases to the point that material strength loss in the seal is accelerated and seal failure occurs after a shorter number of total cycles. Therefore, reduction in the wear rates of the metal valve body and valve seat also increases the life of the valve seal.

The flexible seat design of the present invention also improves pump operation because the valve opens faster and allows the pumped fluid to enter or leave the cylinder quicker. Because of the increased seat deflection, the seat stores energy that can be used to accelerate the valve to the open position before the piston or plunger begins the next stroke. In other words, the increased seat deflection acts like a recoiled spring which results in faster valve opening for smoother and more efficient pump operation.

Although the method and apparatus of the present apparatus has been described in connection with the preferred embodiment, it is not intended to be limited to the specific form set forth herein, but on the contrary it is intended to cover such alternatives and equivalents as can be reasonably included in the scope of the appended claims.

What is claimed is:

1. An improved valve system for use in pumps for handling abrasive fluids, comprising:

a valve body, said valve body comprising a portion having a sloped surface for engaging a complementary sloped surface of a valve seat, said sloped portion of said valve body including a first portion comprising metal and a second portion comprising an elastomer insert;

a valve seat having a sloped surface for engaging the sloped surface of said valve body, said valve seat comprising a generally cylindrical body; and means for increasing deflection of a portion of said valve seat at the point of contact of said metal portion of said sloped portion of said valve body with said sloped portion of said valve seat to reduce the impact stress at said point of impact of said metal portion of said sloped surface of said valve body with said sloped surface of said valve seat, said means for increasing deflection comprising an annular groove in a portion of said cylindrical body, said annular groove being defined by first and second vertical sidewalls and an arched portion extending between said first and second sidewalls.

2. The apparatus according to claim 1, said arched portion comprising a first and second sectors having first and second curvatures, respectively.

3. The apparatus according to claim 2, said first sector of said arch of said annular groove having a curvature which provides increased flexibility of said portion of said sloped face of said valve seat at the point of contact of said metal portion of said sloped face of said valve body.

4. An improved valve system for use in pumps for handling abrasive fluids, comprising:

a valve body, said valve body comprising a portion having a sloped surface for engaging a complementary sloped surface of a valve seat, said sloped surface of said valve body including a first portion comprising metal and a second portion comprising an elastomer insert;

a valve seat having a sloped surface for engaging the sloped surface of said valve body, said valve seat comprising a generally cylindrical body; and means for increasing deflection of a portion of said valve seat at a point of impact of said sloped portion of said valve body with said sloped portion of said valve seat to reduce the impact stress at said point of impact of said sloped surface of said valve body with said sloped surface of said valve seat, said means for increasing deflection being adapted to reduce impact stress at the point of contact of said metal portion of said sloped face of said valve body sloped face with the face of said valve seat, said means for increasing deflection comprising an annular groove in a portion of said cylindrical body, said annular groove being defined by first and second vertical sidewalls and an arched portion extending between said first and second sidewalls.

5. The apparatus according to claim 4, said arched portion comprising a first and second sectors having first and second curvatures, respectively, said first sector of said arch of said annular groove having a curvature which provides increased flexibility of said portion of said sloped face of said valve seat at the point of contact of said metal portion of said sloped face of said valve body.

6. The apparatus according to claim 5, said first sector of said arch having a radius of curvature which is approximately twice the radius of curvature of said second sector of said arch.

* * * * *